United States Patent [19]

Nishimura et al.

[11] Patent Number: 5,537,958
[45] Date of Patent: Jul. 23, 1996

[54] VARIABLE COMPRESSION RATIO SYSTEM FOR TWO-CYCLE ENGINE

[75] Inventors: Seiichi Nishimura, Hamamatsu; Tatsuyuki Masuda, Iwata, both of Japan

[73] Assignee: Sanshin Kogyo Kabushiki Kaisha, Hamamatsu, Japan

[21] Appl. No.: 383,062

[22] Filed: Feb. 3, 1995

[30] Foreign Application Priority Data

Feb. 7, 1994 [JP] Japan ................................. 6-013394

[51] Int. Cl.$^6$ ................................................ F02B 27/06
[52] U.S. Cl. ....................................... 123/65 PE; 123/323
[58] Field of Search ............................... 123/323, 65 PE, 123/65 V, 190.1, 190.12, 190.2

[56] References Cited

U.S. PATENT DOCUMENTS

| 4,121,552 | 10/1978 | Mithuo et al. | 123/65 A |
|---|---|---|---|
| 4,388,894 | 6/1983 | Tanaka et al. | 123/323 |
| 4,397,272 | 8/1983 | Onote | 123/323 |
| 4,763,613 | 8/1988 | Arahata et al. | 123/323 |
| 4,793,347 | 12/1988 | Taniuchi et al. | 123/323 |
| 4,827,880 | 5/1989 | Bar et al. | 60/314 |
| 4,864,980 | 9/1989 | Riese | 123/65 PE |
| 4,998,512 | 3/1991 | Masuda et al. | 123/65 PE |
| 5,000,131 | 3/1991 | Masuda | 123/323 |
| 5,063,888 | 11/1991 | Ozawa et al. | 60/312 |
| 5,111,778 | 5/1992 | Huang | 123/65 PE |
| 5,183,013 | 2/1993 | Ito et al. | 123/501 |
| 5,190,006 | 3/1993 | Motoyama et al. | 123/305 |
| 5,379,731 | 1/1995 | Sayer | 123/65 PE |
| 5,410,993 | 5/1995 | Masuda et al. | 123/65 PE |

FOREIGN PATENT DOCUMENTS

| 0382063 | 8/1990 | European Pat. Off. | |
| 8617390 | 8/1986 | Germany. | |
| 57-68508 | 4/1982 | Japan. | |
| 62-189316 | 8/1987 | Japan. | |
| 2-207131 | 8/1990 | Japan | 123/65 PE |
| 2-207129 | 8/1990 | Japan | 123/65 PE |
| A2175643 | 12/1986 | United Kingdom. | |

OTHER PUBLICATIONS

European Search Report dated Mar. 28, 1994.

*Primary Examiner*—David A. Okonsky
*Attorney, Agent, or Firm*—Knobbe, Martens, Olson & Bear

[57] ABSTRACT

An exhaust control system for a two-cycle engine for controlling the effective compression ratio. The exhaust control valve is operated by a servo mechanism to maintain the appropriate compression ratio in response to engine running conditions. To facilitate servicing, the exhaust control valve is rotatably journalled within the engine cylinder block in a removable sleeve. In addition, a manual operator is provided for manually rotating the exhaust control valve for cleaning operation and to reduce sticking if corrosion occurs.

22 Claims, 3 Drawing Sheets

VARIABLE COMPRESSION RATIO SYSTEM FOR TWO-CYCLE ENGINE

BACKGROUND OF THE INVENTION

This invention relates to a variable compression ratio system for a two-cycle engine, and more particularly to an improved exhaust control valve therefor.

It has been recognized that engines, and particularly two-cycle crankcase compression engines, may be provided with an exhaust control valve arrangement that controls the timing at which the exhaust port opens and closes. The timing of the exhaust port events can be altered during the engine operation, and this permits adjustment of the engine compression ratio when running. Thus, it is possible to operate a diesel engine at a relatively high compression ratio at low and mid-range speeds to obtain optimum performance. The compression ratio can be reduced at the high-load and high-speed conditions to maintain appropriate temperature control.

Generally, this type of exhaust control valve is a rotary valve that extends transversely through a portion of the exhaust passage adjacent the exhaust port. By rotating the valve, the upper portion of the exhaust port can be selectively obscured, and thus change the timing. In some instances the exhaust control valve is provided in a supplemental exhaust port that merges at its downstream end into the main exhaust passage.

Although these devices are extremely effective, there are some areas where problems can arise. Specifically, the exhaust control valve is subject to accumulating deposits, particularly with two-cycle engines where the exhaust may contain some lubricant. When the engine is shut down, these deposits can solidify due to the temperature elevation which occurs after shutdown and can cause sticking of the valve when the engine is restarted.

There have been proposed arrangements wherein the valve is operated through a cycle or number of cycles, either at shutdown or upon restarting, so as to provide a self-cleaning effect. Although these systems are effective, even they can be improved.

For example, the time at which the self-cleaning operation is performed is quite important. If the self-cleaning operation is done immediately after shutdown, it may be done too early, and deposits can still form after the valve has been cleaned. On the other hand, if the time period before the self-cleaning operation is initiated is too long, then the mechanism for operating the valve may not be strong enough to rotate the valve and effect its self-cleaning.

In addition to the aforenoted problems, self cleaning valves do not themselves attend to another potential problem. That is, in many applications for two cycle engines, for example when used in marine propulsion, the engine may be in an environment where corrosion occur. This is particularly true when operating in marine environments. Corrosion may occur between the valve and the body of the engine in which the valve is journaled. This can occur during periods of long non-use and the self cleaning mechanisms may not be fully capable of cleaning the corrosion and freeing corroded valves.

It is, therefore, a principal object of this invention to provide an improved exhaust control valve for an engine and an operation for permitting manual cleaning thereof.

It is a further object of this invention to provide an improved structure wherein the exhaust control valve of an engine may be manually operated through a mechanical advantage mechanism so as to effect a cleaning operation.

It has been generally the practice to rotatably journal the exhaust control valve directly in the body of the engine in which the exhaust passage is formed. Normally, this is the cylinder block. However, such direct journalling can give rise to some objections.

For example, if wear occurs, then it may be necessary to either rebore the cylinder block and use an oversized valve or resort to some other expedient. In addition, the self-cleaning operation may clean the exhaust valve, but it may not clean the associated portions of the exhaust passage, and buildup may occur adjacent the valve.

It is, therefore, a still further object of this invention to provide an improved exhaust control valve for an engine that facilitates disassembly, servicing, and cleaning.

SUMMARY OF THE INVENTION

The features of this invention are adapted to be embodied in an exhaust control valve for an engine having an engine body that defines in part a combustion chamber and through which an exhaust passage passes for discharging exhaust gases from the combustion chamber to the atmosphere. A control valve is journalled for rotation in the engine body and has a portion that is adapted to extend at least in part into the exhaust passage for controlling the timing of opening of the exhaust passage.

In accordance with a first feature of the invention, means are provided for manually operating the control valve for cleaning the control valve.

In accordance with another feature of the invention, the engine body is formed with a bore in which a sleeve is detachably connected. The control valve is rotatably journalled in this sleeve.

DETAILED DESCRIPTION OF THE PREFERRED EMBODIMENT OF THE INVENTION

Figure 1:
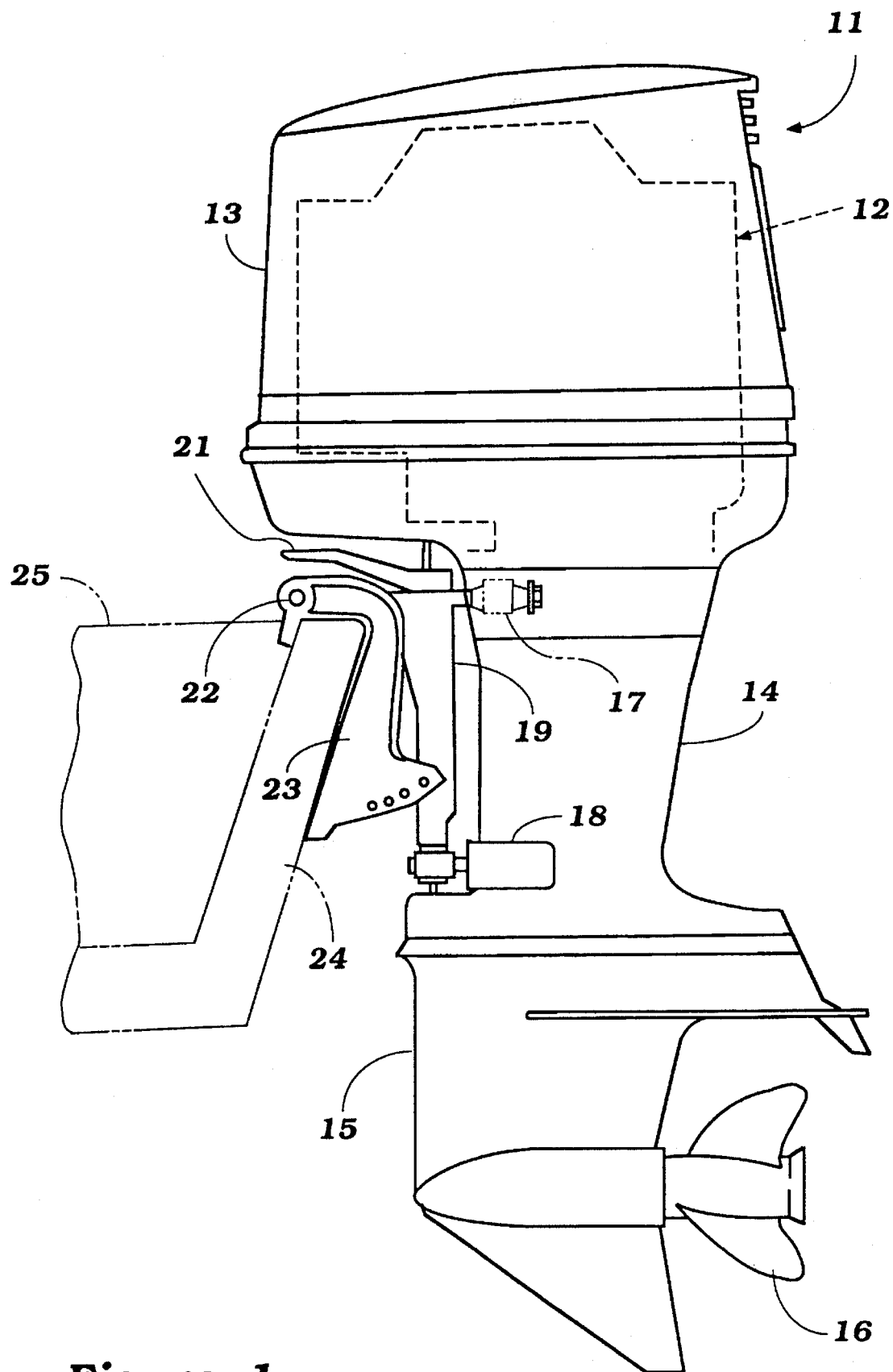
FIG. 1 is a side elevational view of an outboard motor constructed in accordance with an embodiment of the invention.

Referring now in detail to the drawings, an outboard motor constructed in accordance with an embodiment of the invention is identified generally by the reference numeral 11. The invention is described in conjunction with an outboard motor because the invention has particular utility in conjunction with two-cycle internal combustion engines. Such engines are frequently employed as the power units for outboard motors.

Figure 2:
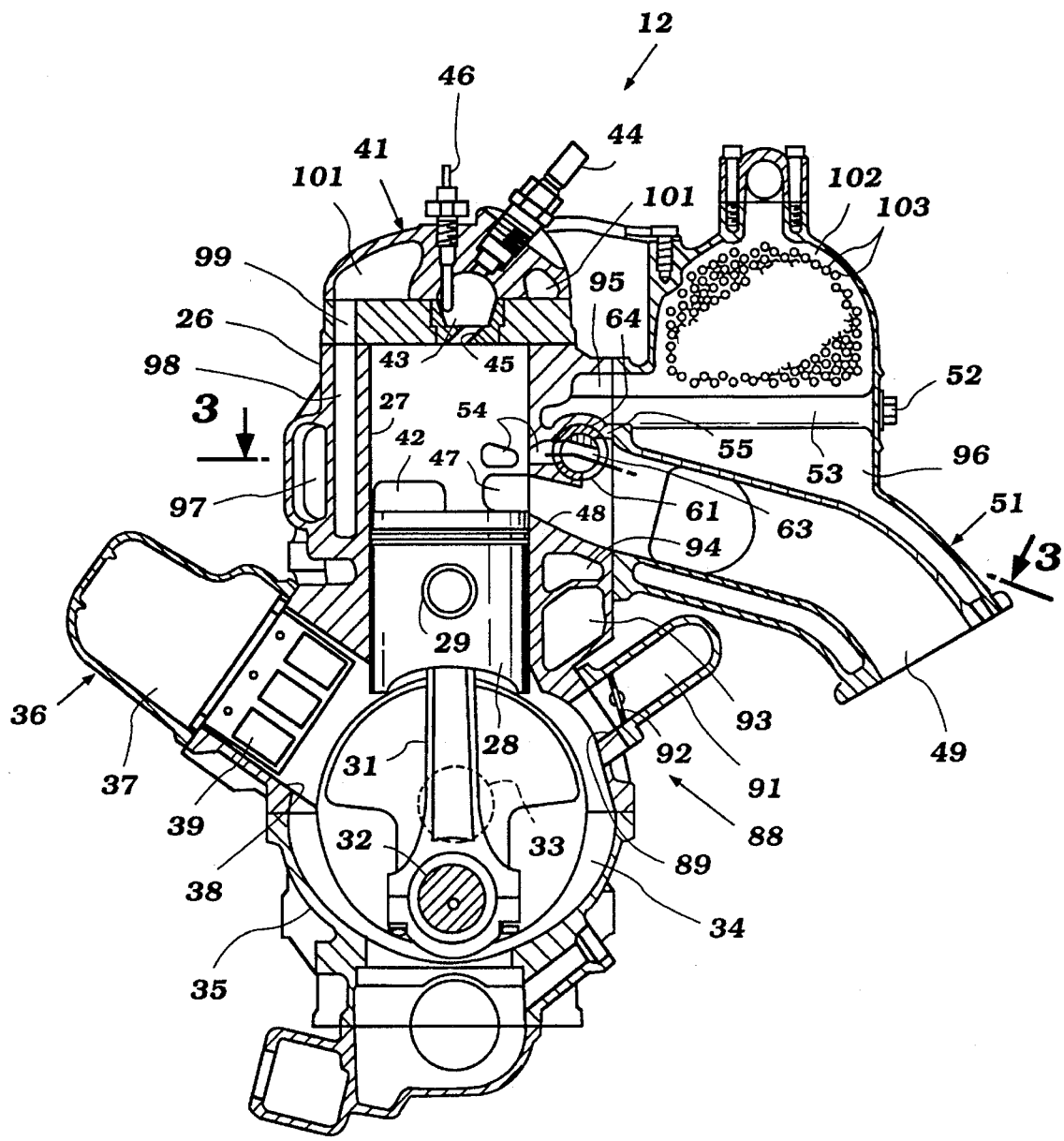
FIG. 2 is a cross-sectional view taken along a horizontally extending plane when viewed in relation to FIG. 1 and shows a single cylinder of the engine.
Figure 3:
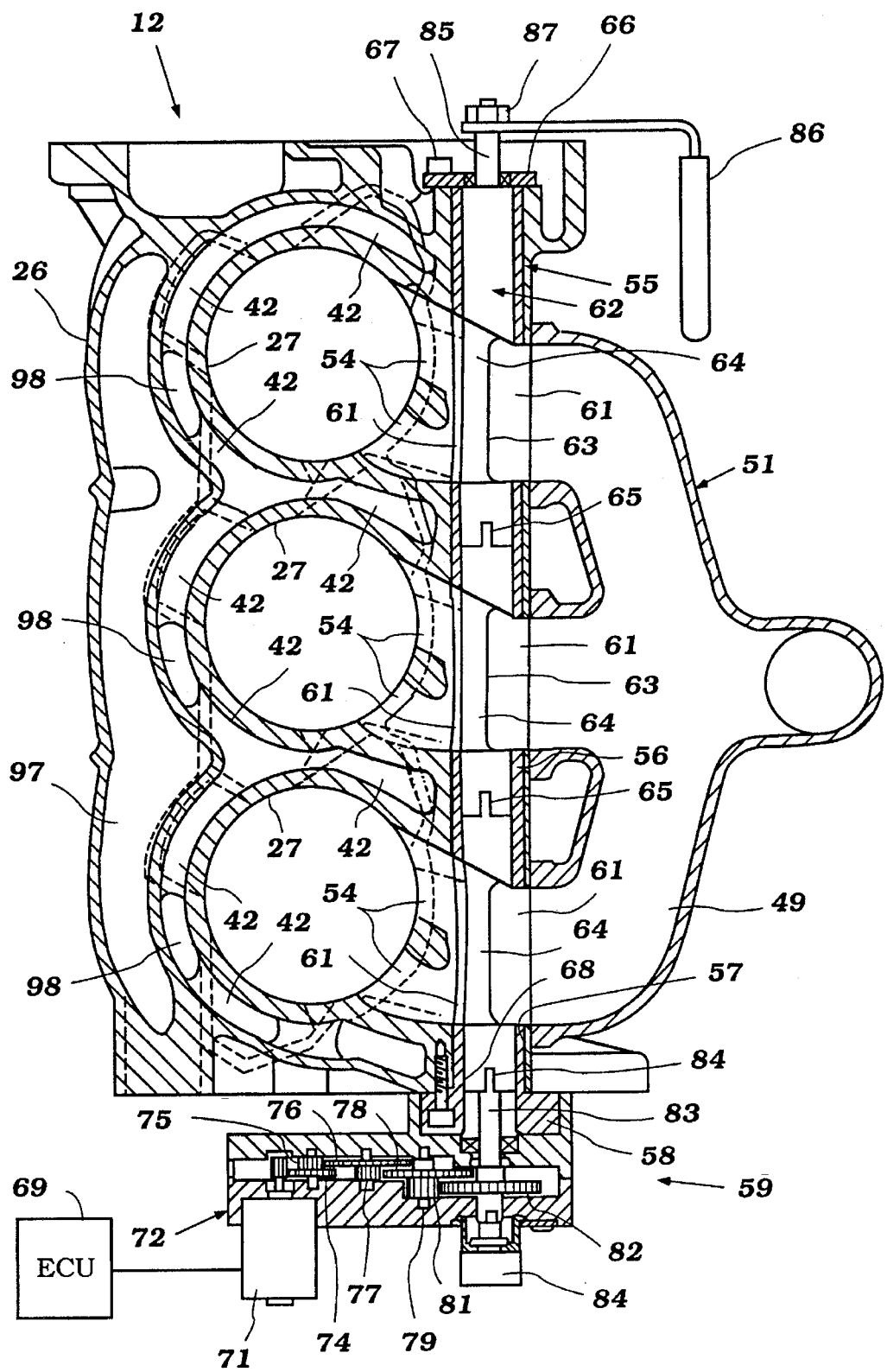
FIG. 3 is an enlarged cross-sectional view taken along the line 3—3 of FIG. 2.

Therefore, the outboard motor 11 is provided with a two-cycle, three-cylinder in-line crankcase compression diesel engine, indicated generally by the reference numeral 12 and shown in more detail in FIGS. 2 and 3 as its propulsion device. The engine 12 forms a portion of the power head of the outboard motor 11 and is surrounded by a protective cowling 13.

As is typical with outboard motor practice, the engine 12 is supported so that its crankshaft rotates about a vertically extending axis. This crankshaft is coupled to a drive shaft that is journalled within a drive shaft housing 14 and which depends into a lower unit 15 where it drives a propeller 16 through a conventional forward/neutral/reverse transmission.

A steering shaft (not shown) is affixed to the drive shaft housing 14 by means of upper and lower brackets 17 and 18. This steering shaft is journalled for steering movement within a swivel bracket 19. A tiller 21 is, therefore, affixed to the upper end of this steering shaft for steering of the outboard motor 11 in a well-known manner.

The swivel bracket 19 is pivotally connected by means of a pivot pin 22 to a clamping bracket 23. This pivotal movement permits tilt and trim movement of the outboard motor 11, as is also well known in this art. The clamping bracket 23 includes a suitable device for affixing it to a transom 24 of an associated watercraft 25, which is shown in phantom.

As has been noted, the foregoing description of the outboard motor 11 is merely to permit those skilled in the art to understand a specific way in which the invention may be utilized. As has already been noted, the invention is capable of use with engines having a wide variety of applications, but is particularly adapted for use with two-cycle engines.

Referring now to FIGS. 2 and 3, the engine 12 is shown in more detail with FIG. 2 being a cross-sectional view taken along a horizontal plane relative to FIG. 1, and FIG. 3 being an enlarged cross-sectional view taken along the line 3—3 of FIG. 2.

As has been noted, the engine 12 is of the multi-cylinder type and includes a cylinder block 26 in which one or more cylinders 27 are formed. The cylinders 27 are, in the illustrated embodiment, of the in-line type, and hence are disposed one vertically above the others. In the specific embodiment illustrated, the engine 12 is of the three-cylinder type. It should be readily apparent to those skilled in the art, however, how the invention may be employed with engines having other cylinder numbers and other cylinder configurations.

Pistons 28 reciprocate in the cylinder bores 27 and are connected by means of piston pins 29 to the upper or small ends of respective connecting rods 31. The lower ends of the connecting rods 31 are journalled on throws 32 of a crankshaft 33. The crankshaft 33 is rotatably journalled within a crankcase chamber 34 formed by the lower end of the cylinder block 26 and a crankcase member 35 that is affixed to it in any well-known manner. As is also well known in the two-cycle art, the crankcase chambers 34 associated with each of the cylinder bores 27 are sealed from each other in an appropriate manner.

An air charge is delivered to the crankcase chambers 34 through an induction system, indicated generally by the reference numeral 36, which includes a plenum chamber 37 that receives air from an atmospheric air inlet device which may include a silencing arrangement. This air is delivered to the chambers 34 through intake ports 38 formed in the lower end of the cylinder block 26. Reed-type check valves 39 are provided in each of the intake ports 38 so as to permit the air flow to move into the crankcase chambers 34 when the pistons 28 are moving upwardly and to preclude reverse flow as the pistons 28 move downwardly.

As the piston 28 continues its downward movement, the air charge which has been compressed in the crankcase chambers 34 is transferred to a combustion chamber formed above the pistons 28 by the cylinder bores 27 and a cylinder head assembly 41 which is fixed in a well-known manner to the cylinder block 26. The charge is transferred to these combustion chambers through a plurality of scavenge passages 42 formed in the cylinder block 26 and extending from the crankcase chambers 34 to the respective cylinder bores 27. These scavenge passages 42 are arranged in an orientation so as to provide a Schnurl type of scavenging.

In the illustrated embodiment, the engine 12 operates on a diesel cycle, and therefore, in addition to the combustion chamber formed below the cylinder head 41, the cylinder head assembly 41 further defines a pre-combustion or torch chamber 43. Fuel is injected into this pre chamber 43 by fuel injectors 44. This fuel will ignite upon injection due to the high pressure that exists and begin combustion. The burning charge then issues through a throat 45 into the main combustion chamber, wherein combustion continues.

If desired, a glow plug 46 may be mounted in the cylinder head assembly 41 for assisting in starting and/or during running operations for at least warm-up.

The burning charge will expand and drive the piston 28 downwardly. Eventually, a main exhaust port 47, which is disposed between the side scavenge passages 42, will open and communicate the exhaust gases with an exhaust passage 48 formed in the cylinder block 26 and which communicates with the exhaust passages 49 of an exhaust manifold, indicated generally by the reference numeral 51, and which is affixed to the cylinder block 26 by means including threaded fasteners 52. The fasteners 52 extend through tubular sections 53 of the exhaust manifold 51 and which are threaded into the cylinder block 26 in a known manner.

The exhaust manifold 51 delivers the exhaust gases downwardly through a drive shaft housing 14 and lower unit 15 for discharge to the atmosphere through the body of water in which the watercraft is operating in any known manner.

In order to vary the effective compression ratio of the engine 12, there are provided a pair of auxiliary exhaust ports 54 that are spaced vertically above the main exhaust port 47 in the cylinder 27. These auxiliary exhaust ports 54 communicate with the main exhaust passageway 48 via an exhaust control valve, indicated generally by the reference numeral 55, and which is shown best in FIG. 3.

This exhaust control valve assembly 55 is comprised of an outer sleeve 56 that is received within a bore 57 that extends transversely through the cylinder block 26 and which intersects the portions of the exhaust passage terminating at the auxiliary exhaust ports 54. This sleeve 56 is provided with a flange 58 at one end thereof, which is held in place by a servomotor mechanism 59, which will be described later and which operates so as to position the exhaust control valve 55. The sleeve 56 is provided with passages 61 which extend from the auxiliary exhaust ports 54 to the exhaust passage 48, and thus provide a gas flow path therebetween.

The exhaust control valve 55 further includes a cylindrical valve element 62 that has cylindrical portions formed between the exhaust passages 48 and which are journalled in the sleeve 57 for free rotation. In the area where the exhaust passages 61 are formed, the exhaust valve element 62 is provided with cutouts 63 which form valve portions 64 which, when rotated into a fully opened position as shown in FIG. 2, permit unrestricted flow through the auxiliary exhaust ports 54 into the main exhaust passage 48. When the valving portions 64 are rotated from the position shown in FIG. 1, they will block the auxiliary exhaust ports 54 and preclude any exhaust gases from flowing therethrough. This, in effect, delays the time of closing and opening of the exhaust ports of the engine and in effect raises the effective compression ratio. This technique is known in the art, although the specific valve arrangement described is novel.

The exhaust control valve 62 is, in fact, made up of a plurality of segments that are interconnected by means of tongue and groove connections 65 so as to accommodate differences in linear thermal expansion without affecting the angular positions between the interconnected valve sections. In the illustrated embodiment, there is provided one valve section 64 for each cylinder 27.

As has been noted, the sleeve 56 is held axially in the cylinder block. This is positioned between a first plate 66 disposed at one end of the cylinder block and held in place by fasteners 67. At its opposite end, the sleeve 56 has a flange 58 which as noted is held in place in part by the servo mechanism 59 for operating the control valve assembly 55. In addition, threaded fasteners 68 hold this flange to the front or lower end of the cylinder block 26.

The control strategy for the positioning of the control valve 55 is provided by an ECU, shown schematically at 69, and which receives certain signals indicative of engine running condition. These may be engine speed and load, with the load being sensed by, for example, the operator demand dependent upon the position of the accelerator pedal. As has been noted, the control valve 55 is normally positioned in an open position to provide a low compression ratio at high-speed, high-load conditions. At lower speed, low-load conditions, the control valve 55 is closed so as to elevate the compression ratio and permit better combustion efficiency.

The ECU outputs its signal to a reversible electric servomotor 71 which drives a transmission, indicated generally by the reference numeral 72. This transmission includes a first gear 73 that is affixed to the output shaft of the servo motor 71 and which drives a first gear section 74 of a compound gear mounted on a common shaft in the transmission housing. This first section includes a second segment 75 which is enmeshed with a first section 76 of a second compound gear. This second compound gear has a second segment 77 which is enmeshed with a first section 78 of a third compound gear. The third compound gear is mounted on a shaft 79 and has a second segment 81 which is enmeshed with a gear 82 that is affixed to a valve driving shaft 83. This shaft has a tongue and groove connection 84 to the valve element 64 for driving it.

The system finally includes a potentiometer 80 that is affixed to the valve driving shaft 83 and which outputs a signal back to the ECU 69 indicative of the position of the control valve assembly 55.

The specific strategy for operating the control valve 55 may be of any known type. This may also include a self-cleaning cycle which, upon engine shutdown, rotates the control valve element 64 through a greater-than-normal range of rotation so as to affect a self-cleaning operation.

Even though this self-cleaning operation is provided, there still may be instances when the valve assembly 55 may become stuck. The servomotor assembly 59, although it has a large gear reduction, still may not generate sufficient power to clear a stuck valve. Therefore, there is provided an extending shaft 85 on the end of the control valve 55 opposite the servomotor mechanism 59. A crank handle 86 may be affixed when desired to the shaft 85 by a threaded fastener 87 and is easily accessible by an operator when so attached so that the shaft 62 may be manually rotated for self-cleaning operation.

In addition to having the exhaust control valve 55 for controlling the compression ratio of the engine, the engine may also have an arrangement for controlling the amount of scavenging, and this includes a scavenge control system shown in FIG. 2 and identified generally by the reference numeral 88. This scavenge control system 88 includes a plurality of scavenge control passages 89 which extend from the individual crankcase chambers 34 to a scavenge balance passage 91. A flow-controlling throttle valve 92 is positioned in each of the passages 89. When the control valve 92 is in its closed position, normal scavenging will result. If, however, the control valves 92 are open, then the amount of scavenging in each cylinder will be reduced, since the scavenge pressure will be transmitted from one chamber 34 to an adjacent chamber not under a compression cycle. This can be utilized for engine control purposes, as is known in this art.

The engine 12 is provided with a water-cooling system. However, this water-cooling system, unlike conventional water-cooling systems employed with outboard motors, does not circulate as coolant water from the body of water in which the watercraft is operating for direct cooling of the engine. Rather, the engine 12 is provided with a sealed cooling system that contains a coolant of a desired character which may comprise pure water or a mixture of water and an antifreeze agent so as to increase its boiling point and also decrease its freezing point. This cooling system includes a cylinder block cooling jacket having a lower portion 93 which cools the lower part of the cylinder block 26. In addition, there is provided an exhaust passage cooling jacket 94 which has a lower part that extends on the lower side of the exhaust passages 48 and an upper part 95 that extends on the upper side of the exhaust passages 48 and adjacent the exhaust control valve 55 for cooling it. This passage 95 communicates with an integral cooling jacket 96 formed in the exhaust manifold 51.

There is provided a further cylinder block cooling jacket portion 97 and vertical risers 98 which deliver coolant from the area between scavenge passages 42 of the individual cylinders 27 vertically upwardly to passages 99 formed in the cylinder head which communicate with a cylinder head cooling jacket 101 which surrounds the combustion chambers and pre chambers 43. The flow through these various cooling jackets 93–101 is controlled by a pump (not shown) and in any desired flow pattern.

In addition, the exhaust manifold cooling jacket 96 is formed with an upper portion 102 in which a heat exchanger 103 extends. The heat exchanger 103 comprises a plurality of small tubes through which water is circulated from the body of water in which the watercraft is operated. Hence, this water is utilized for the heat exchanger 103, but does not contact directly the engine components, and hence corrosion of these components will be substantially reduced.

It should be readily apparent from the foregoing description that the described exhaust control valve permits the control valve to be easily operated manually should it become stuck either due to combustion deposits or external corrosion caused by operation in a marine environment. In addition, because the valve assembly is mounted in a separate sleeve, replacement and servicing is facilitated without necessitating any operations on the major components of the engine. Of course, the foregoing description is that of a preferred embodiment of the invention, and various changes and modifications may be made without departing from the spirit and scope of the invention as defined by the appended claims.

We claim:

1. An exhaust control valve for an engine having an engine body defining at least in part a combustion chamber, an exhaust passage passing at least in part through said engine body for discharging exhaust gases from said combustion chamber to the atmosphere, a control valve journalled for rotation in said engine body and having a portion adapted to extend at least in part into said exhaust passage for controlling the timing of opening of said exhaust passage and an exposed portion providing means for manually operating said control valve for cleaning said control valve.

2. An exhaust control valve as in claim 1, wherein the engine body defines a plurality of combustion chambers each having a respective exhaust passage and control valve and means for manually operating all of said control valves.

3. An exhaust control valve as in claim 2, wherein all of the control valves are operated in unison.

4. An exhaust control valve as in claim 3, wherein there is provided a servomotor for controlling the position of the control valves and disposed at one end of the engine.

5. An exhaust control valve as in claim 4, wherein the means for manually operating the control valves is disposed at the end of the engine opposite to the servomotor.

6. An exhaust control valve as in claim 5, wherein the means for manually operating the control valves comprises a lever detachably affixed to the control valve for rotating the control valve.

7. An exhaust control valve as in claim 1, wherein the engine is a two-cycle crankcase compression engine and the engine body comprises a cylinder block defining a cylinder bore.

8. An exhaust control valve as in claim 7, wherein the control valve is disposed at the upper end of the exhaust passage.

9. An exhaust control valve as in claim 8, wherein the engine body defines a plurality of combustion chambers each having a respective exhaust passage and control valve and means for manually operating all of said control valves.

10. Art exhaust control valve as in claim 9, wherein all of the control valves are operated in unison.

11. An exhaust control valve as in claim 10, wherein there is provided a servomotor for controlling the position of the control valves and disposed at one end of the engine.

12. An exhaust control valve as in claim 11, wherein the means for manually operating the control valves is disposed at the end of the engine opposite to the servomotor.

13. An exhaust control valve as in claim 12, wherein the means for manually operating the control valves comprises a lever detachably affixed to the control valve for rotating the control valve.

14. An exhaust control valve as in claim 13, wherein the cylinder block is provided with a bore that extends longitudinally through the cylinder block on the upper end of the exhaust passages and further including a sleeve detachably connected within said cylinder block bore and rotatably journalling the control valve.

15. Art exhaust control valve for an engine having an engine body defining at least in part a combustion chamber, an exhaust passage passing at least in part through said engine body for discharging exhaust gases from said combustion chamber to the atmosphere, a bore extending through said engine body in proximity to said exhaust passage and having a gas flow path therethrough, a tubular sleeve fixed against rotation in said bore, said sleeve having an exhaust passage aligned with a portion of said exhaust passage in said engine body, and a control valve journalled for rotation in said tubular sleeve and having a portion adapted to control the flow through said sleeve exhaust passage for controlling the timing of opening of said engine exhaust passage and the compression ratio of said engine.

16. An exhaust control valve as in claim 15, wherein the engine is a two-cycle crankcase compression engine and the engine body comprises a cylinder block defining a cylinder bore.

17. An exhaust control valve as in claim 16, wherein the control valve is disposed at the upper end of the exhaust passage.

18. An exhaust control valve as in claim 17, wherein the engine body defines a plurality of combustion chambers each having a respective exhaust passage and control valve and means for manually operating all of said control valves.

19. An exhaust control valve as in claim 18, wherein all of the control valves are operated in unison.

20. An exhaust control valve as in claim 19, wherein there is provided a servomotor for controlling the position of the control valves and disposed at one end of the engine.

21. An exhaust control valve as in claim 20, further including means for manually operating the control valves disposed at the end of the engine opposite to the servomotor.

22. An exhaust control valve as in claim 21, wherein the means for manually operating the control valves comprises a lever detachably affixed to the control valve for rotating the control valve.

* * * * *

UNITED STATES PATENT AND TRADEMARK OFFICE
CERTIFICATE OF CORRECTION

PATENT NO. : 5,537,958
DATED : July 23, 1996
INVENTOR(S) : Seiichi Nishimura et. al.

It is certified that error appears in the above-indentified patent and that said Letters Patent is hereby corrected as shown below:

```
Column 7, line 36, "Art exhaust" should be --An exhuast--.
Column 8, line 7,  "Art exhaust" should be --An exhaust--.
```

Signed and Sealed this

Twenty-ninth Day of July, 1997

Attest:

BRUCE LEHMAN

Attesting Officer

Commissioner of Patents and Trademarks